United States Patent

[11] 3,623,960

| [72] | Inventor | David L. Williams<br>Reading, Mass. |
|---|---|---|
| [21] | Appl. No. | 26,362 |
| [22] | Filed | Apr. 7, 1970 |
| [45] | Patented | Nov. 30, 1971 |
| [73] | Assignee | Monsanto Research Corporation<br>St. Louis, Mo. |

[54] GLUCOSE DETERMINATION METHOD
4 Claims, 5 Drawing Figs.

[52] U.S. Cl. .................................................. 204/1 T,
204/195
[51] Int. Cl. .................................................. G01n 27/46
[50] Field of Search ........................................... 204/1 T,
195

[56] References Cited
UNITED STATES PATENTS

| 3,367,849 | 2/1968 | Blaedel et al. ............... | 204/195 |
| 3,380,905 | 4/1968 | Clark .......................... | 204/195 |
| 3,479,255 | 11/1969 | Arthur ......................... | 204/1 T |
| 3,539,455 | 11/1970 | Clark .......................... | 204/195 |
| 3,542,662 | 11/1970 | Hicks et al. .................. | 204/195 |

OTHER REFERENCES

Clark et al. " Annals N.Y. Academy of Science," Vol. 102, Art. 1, pp. 29–45, Oct. 31, 1962

*Primary Examiner*—T. Tung
*Attorneys*—L. Bruce Stevens, Jr. and Robert M. Dickey ABSTRACT: An electrochemical apparatus especially applicable for clinical use in determining glucose concentrations in solutions thereof comprising (1) a sample reservoir, (2) a glucose oxidase member consisting essentially of a well closed at the bottom by a dialysis membrane and containing an anode, glucose oxidase and a buffer solution, (3) a reference member consisting essentially of a well closed at the bottom by a dialysis membrane and containing an anode and buffer solution, (4) a cathode, (5) means for positioning the members and the cathode in the sample reservoir, (6) means for applying a voltage between the cathode and the anodes, and (7) means for measuring the electrical currents produced. The process for using the apparatus comprises adding a buffered glucose solution to the sample reservoir, immersing the cathode and the members into the solution, adding a quinone either to the members or to the glucose solution, applying a voltage between the cathode and the anodes and measuring the currents produced.

PATENTED NOV 30 1971 3,623,960

INVENTOR
DAVID L. WILLIAMS

BY
Robert M. Dickey
ATTORNEY

INVENTOR
DAVID L. WILLIAMS

BY Robert M. Dickey
ATTORNEY

GLUCOSE DETERMINATION METHOD

FIELD OF THE INVENTION

This invention relates to an apparatus and method for monitoring an enzyme reaction by an electrochemical technique. More particularly, the invention relates to an electrochemical apparatus for monitoring the reaction of glucose oxidase on a buffered solution of glucose in the presence of a quinone acceptor.

BACKGROUND

A number of methods have recently been reported for monitoring enzyme reactions by electrochemical means including the measurement of urea via urease and a specific $NH_4^+$ electrode and the measurement of glucose via glucose oxidase and peroxidase and a current collecting electrode or by monitoring oxygen decrease with an oxygen electrode.

The reported method for monitoring the glucose-glucose oxidase reaction depends on the use of oxygen as an enzyme acceptor to produce a mixture of gluconic acid and hydrogen peroxide. The hydrogen peroxide is then reacted with potassium ferrocyanide in the presence of peroxidase to produce potassium ferricyanide and potassium hydroxide. This method is an important advance in the art of the determination of glucose. However, the hydrogen peroxide oxidation of ferrocyanide in the presence of peroxidase in a complex solution such as whole blood is not straightforward and various components of the blood may interfere to cause erroneous results. In the measurement of $O_2$ decrease, aeration must be controlled and a limited linear range exists for the $O_2$ current decrease glucose concentration relationship.

One object of this invention is to provide a simple, easily operated electrochemical apparatus for measuring glucose concentration in solutions thereof.

A further object is to provide an electrochemical unit which may be used repeatedly for glucose determinations and which may be stored between determination without disassembly.

Another object is to provide a process for the accurate measurement of glucose concentration in solutions thereof and particularly in whole blood.

These and other objects are attained by a particular arrangement of electrochemical cells and electrodes coupled with current indicating means and by carrying out the process using glucose oxidase to oxidase the glucose and a quinone as an enzyme acceptor.

In its simplest form the apparatus of this invention comprises a reservoir adapted to contain a supply of glucose solution to be tested, a cathode, a member containing an anode and, glucose oxidase, and a reference member containing an anode said cathode and members being immersed in said solution, the cathode being connected to a power supply source and the two anodes being connected to separate circuits which measure the current produced at each cell.

The glucose oxidase member is closed at the bottom thereof by a dialysis membrane, contains a layer of glucose oxidase, a buffer, and is fitted with a removable anode the active surface of which is situated close to but does not touch the upper surface of the dialysis membrane.

The reference member should be substantially the same as the glucose oxidase member except that it contains no glucose oxidase.

The reservoir may be any vessel, such as a beaker, large enough to hold sufficient glucose solution to cover the cathode and the bottom parts of the members.

Each member may be connected to an amplifier stage and thence to a voltmeter where the current produced is read.

In a preferred embodiment of this invention, the reservoir is a vessel jacketed to provide temperature control, the cathode and the two members are removably mounted in a header which fits snugly into the top of the reservoir and the circuits are provided with means for measuring and recording the current differential between the two anodes.

The preferred embodiment of this invention is illustrated in the figures in which.

Figure 1:
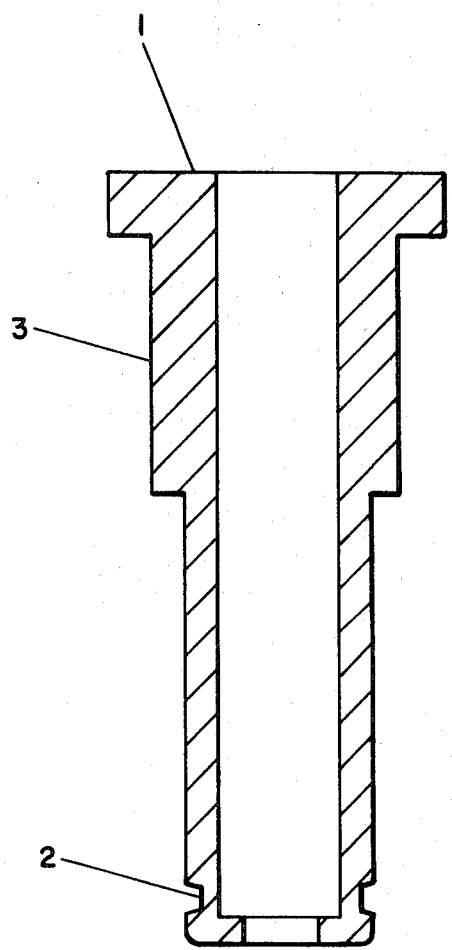
FIG. 1 is a sectional view of one of the two wells in which anodes are placed to form the glucose oxidase and reference members.

Referring now to FIG. 1, each well consists of a tube 1 preferrably cylindrical in shape and open at both ends. A groove 2 is cut near the lower end of said tube into the outside wall thereof to contain any O-ring or other device for holding a dialysis membrane in place across the bottom of said tube. A flanged bushing 3 may be an integral part of tube 1 or a separate bushing bonded to the outside surface of tube 1 and serves to position the well within the header as shown in FIG. 3.

Figure 2:
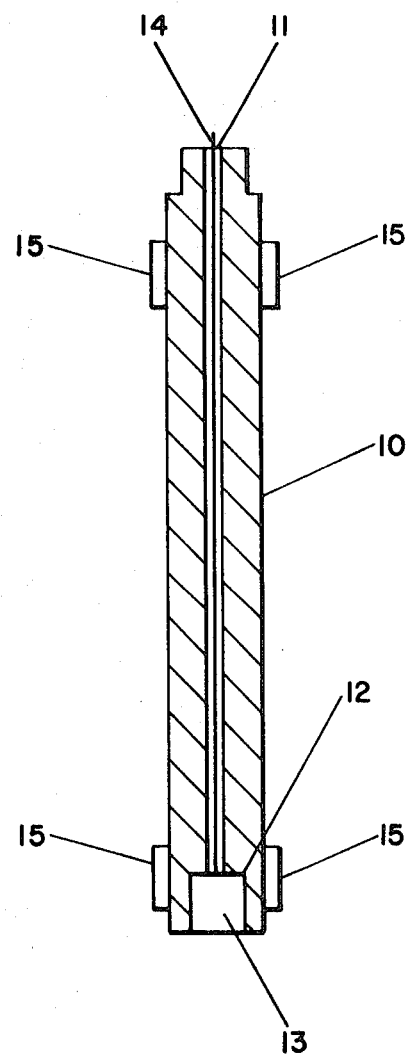
FIG. 2 is a sectional view of one of the two identical anode structures which are removably positioned in the wells.

The anode structure illustrated in FIG. 2 consists of a carefully machined insulating rod 10 having a hole 11 bored down the middle thereof and expanded at 12 to receive an anode in the form of a stub 13. The rod may be made of glass or a plastic material such as polymeric methyl methacrylate. Attached to the stub 13 is a lead wire 14 which extends upwards through hole 11 and out at the top thereof. Both the stub and the lead wire are bonded within hole 11 by an epoxy resin or other potting compound. Near the top and bottom of rod 10 are a series of lugs 15 which serve to position the said rod accurately within the well while leaving a space between the rod and inner wall of the well for introducing buffer solution and glucose oxidase solution.

Figure 3:
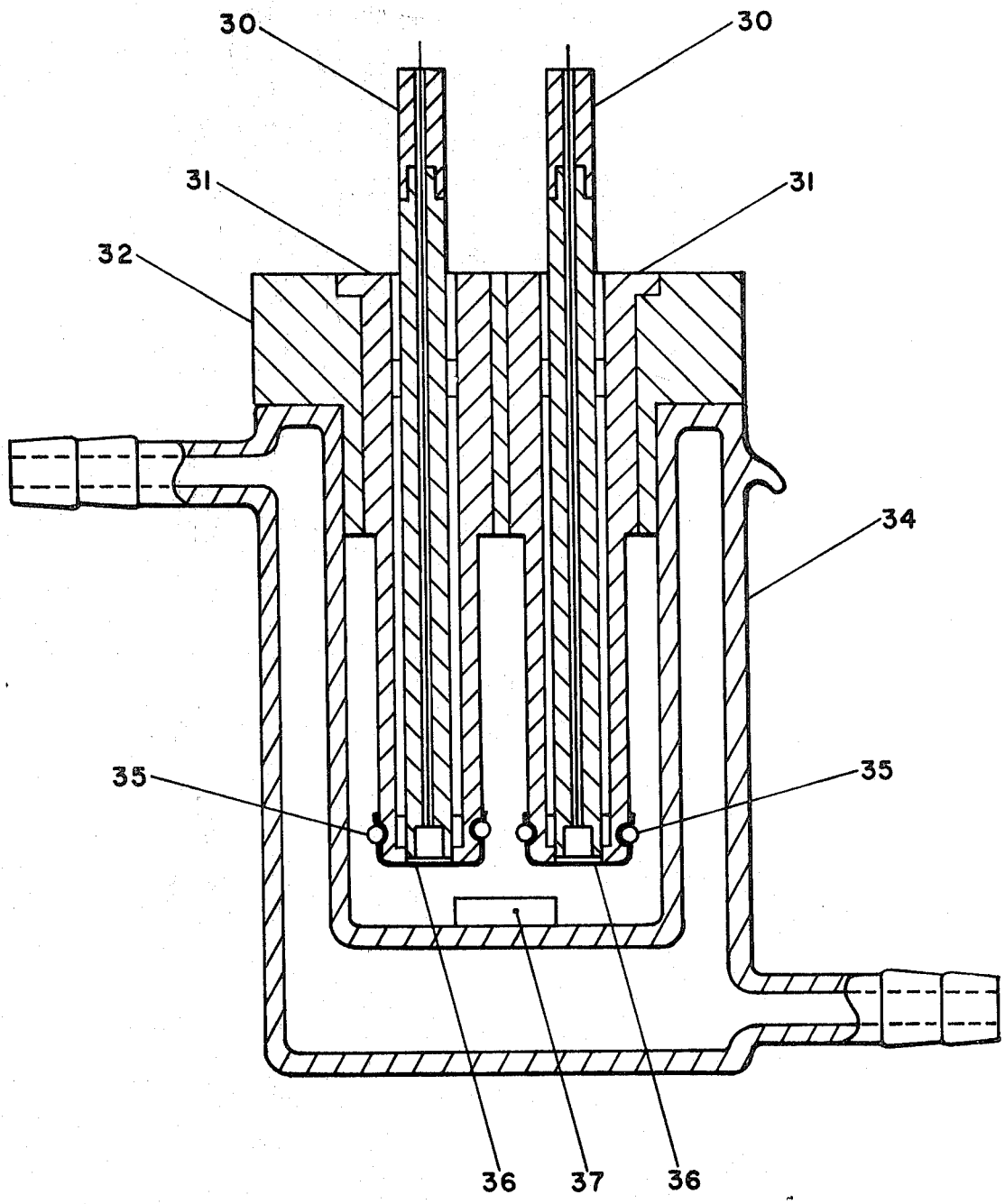
FIG. 3 is a sectional view of a complete apparatus with a glucose oxidase member, a reference member and a cathode held in position by a header in a jacketed sample reservoir.

FIG. 3 shows two anode structures 30 positioned within two wells 31 which are in turn positioned within header 32 by means of recess 33 machined therein to receive the flange of the wells. The header assembly fits snugly within the interior wall of jacketed reservoir 34. Held in place by O-rings 35 are dialysis membranes 36. A magnetic stirrer 37 is located on the bottom of the inner surface of the reservoir. A cathode not shown is located in header 32 to the rear of and substantially between the wells 31 and a filling port, also not shown, is located in the header in front of and substantially between said wells.

Figure 4:
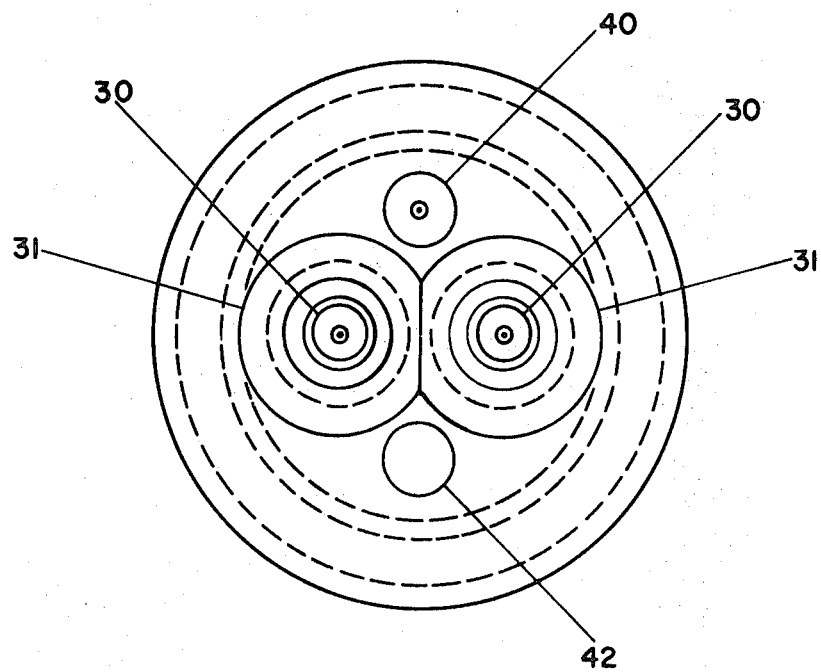
FIG. 4 is a top view of the header showing the location of the cells, the cathode and a supply port.

FIG. 4 demonstrates the spatial arrangement of the anode structures 30, wells 31, a cathode 40 and a filling port 42 within the header 32.

Figure 5:
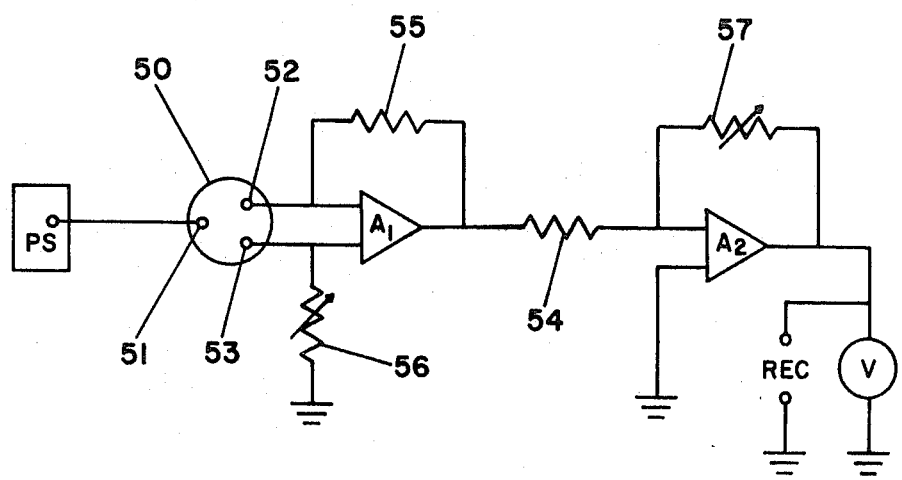
FIG. 5 is a diagrammatic representation of one circuit useful for measuring and recording glucose concentrations.

In FIG. 5, a power source PS is linked through pole 51 of connector 50 to the cathode. The anode from the glucose oxidase member is connected to pole 52 of the connector and the anode from the reference cell is connector to pole 53 thereof. Pole 52 is connected to amplifier A1 at the inverting input and thence through resistor 54 to amplifier A2 at its inverting input. A feedback resistor 55 is located between pole 52 and resistor 54. Pole 53 is connected to amplifier A1 at the direct input and through variable resistor 56 to ground. A variable resistor 57 is located between resistor 54 and the output side of amplifier A2. The output from amplifier A2 is connected to a voltmeter V and a recording instrument REC. The direct input of amplifier A2, the power supply, the voltmeter and the recording instrument are all grounded. In operation the first amplifier stage including fixed resistor 55 and variable resistor 56 adjusts the circuit for differences in the characteristics of the members and the second amplifier stage including variable resistor 57 adjusts the sensitivity or gain of the system.

To measure glucose concentration with the described apparatus, sufficient glucose oxidase in solution preferably in an aqueous buffer is added to the glucose oxidase well to fill the gap between the dialysis membrane and the bottom of the anode. An excess may be used if desired. An identical buffer solution without glucose oxidase is added to the reference well in an amount sufficient to fill the gap between the dialysis membrane and the bottom of the anode. Since there is sufficient space between the anodes and the walls of the wells the filling can be done with the cells assembled and in place in the header and the header in place within the reservoir. Alternatively the anode structures may be removed for more easy addition of glucose oxidase and buffer. A measured amount of a glucose solution to which identical buffer solution has been added along with the quinone is added through the filling port to the reservoir. Enough solution must be added to cover at least the dialysis layer of the members. The glucose and quinone diffuse through the dialysis membranes. The glucose is oxidized by the glucose oxidase in the glucose oxidase member and simultaneously the quinone is reduced to hydroquinone. The reactions occur without the application of an electric current. A voltage of about 0.7 volt is applied between the cathode and the anodes causing the hydroquinone to be oxidized and producing a current which is directly proportional to the amount of glucose oxidized.

In the reference member, a smaller current is produced depending on the nature and amount of extraneous oxidation-reduction couples present in the glucose solution which also diffuse through the dialysis membranes. Since this current will also be produced in the glucose oxidase member, its value must be subtracted from the current produced at the glucose oxidase member to obtain a true reading of the glucose oxidation reaction.

The reactions which occur in the process of this invention are:

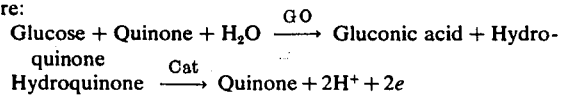

Hydroquinone $\xrightarrow{Cat}$ Quinone $+ 2H^+ + 2e$

The first reaction starts as soon as the glucose diffuses through the dialysis membrane and would continue until all the glucose is oxidized. The second reaction occurs at the anode which acts as an electron transfer surface when voltage is applied. Both reactions can be made to occur simultaneously if a voltage is applied when the cells are inserted into the vessel.

Quinones which may be used in the process of this invention are organic compounds containing a quinone structure which are readily reducible to a hydroquinone which, in return, is readily oxidizable back to the original quinone. The quinones should be at least as soluble in water as oxygen to prevent completion from oxygen. The amount of quinone should be sufficient to oxidize all of the glucose present. However, since it is constantly being replenished by oxidation of the hydroquinone it does not have to be present originally in stoichiometric proportions relative to the amount of glucose. The quinone may be added to the glucose solution or to the buffer solution which is placed in the members.

The exact nature of the buffer to be used is not critical so long as it is capable of maintaining a pH of 4 to 8. Since hydrogen ions are produced sufficient buffer must be present to maintain the pH at a constant value. An excess of buffer will generally be used. A standard sodium phosphate buffer may conveniently be used.

The anodes are capable of acting as an electron transfer surface at which the hydroquinone is oxidized to the corresponding quinone. In general the anode should be a noble metal stub or foil such as platinum, palladium, ruthenium, iridium, gold, etc. However other materials such as carbon may be used. The anodes and the lead wires attached thereto should be encased in solid electrical insulating means such as epoxy resins or other well known potting compounds. The only part of the anodes not insulated is the bottom layer thereof which serves as an electron transfer surface for the oxidation of hydroquinone.

For dialysis a thin membrane is required which permits glucose and quinone to migrate to the glucose or active anode. Suitable membranes are regenerated cellulose, cellulose esters such as cellulose nitrate, cellulose acetate, etc., cross-linked polyvinyl alcohol, etc. The membrane thickness is critical only to the extent that it controls the rate of diffusion of the glucose into the glucose member. Thicknesses of 0.5 mil or lower may be used by employing porous structural supports.

The glucose oxidase layer may consist of glucose oxidase dispersed in buffer as long as sufficient amount is used to fill the gap between the bottom of the anode and the top of the dialysis layer. As an alternative the glucose oxidase may be absorbed into a thin porous membrane inert to the reaction or into a fine mesh nylon screen. A further alternative is to incorporate the glucose oxidase into a gelled matrix which can then serve both as the glucose oxidase layer and the dialysis layer.

The glucose concentration measurements should be made at constant temperature within the range 20° to 40° C. To accomplish this the vessel serving to contain the test solution is conveniently a jacketed vessel with provision for circulating a fluid at constant temperature through the jacket. However, the same control may be attained by using a single walled vessel and immersing in a constant temperature bath while running the tests.

The apparatus and process of this invention are particularly suitable for clinical analysis of whole blood to determine its glucose content accurately and rapidly. The process is independent of dissolved oxygen and is unaffected by the common preservatives such as oxalate, citrate, EDTA, etc. It can also be used as a quick check on the accuracy of glucose solutions to be used for intravenous feedings and in various commercial operations using sugar solutions where it is important to know the glucose concentration.

An added convenience of the apparatus of this invention is that the header containing the members and the cathode may be removed form the sample reservoir after a test is completed, washed and stored in buffer solution until needed for the next test, or, if desired, the members may be removed from the header, washed and stored in buffer. Since the glucose oxidase does not migrate through the dialysis layer, the glucose oxidase member may be used repeatedly without further addition of enzyme until such time as the glucose oxidase loses activity.

The apparatus of this invention may be standardized prior to sample testing by the following procedure. A standardizing solution containing the following ingredients in 1,000 ml. of water is prepared:

2.2 g. NaH$_2$PO$_4$·H$_2$O
23.2 g. Na$_2$HPO$_4$·12 H$_2$O
1.5 g. NaCl
0.3 g. KCL
1.0 g. Benzoquinone
0.1 g. Hydroquinone Ten ml. of the solution is added to the reservoir kept at 25° C. ± 0.2 ° C. The header containing the members and the cathode are immersed into the solution and electrical connections are made. After 5 minutes the zero offset is adjusted with the variable resistor of the first amplifier stage to obtain a 0 mv. reading on the meter. In this position the sensing of the hydroquinone diffusion at the members is equalized. To complete the standardization, 0.05 ml. of 1 molar glucose solution is delivered to the reservoir and the sensitivity control is adjusted to obtain 90 mv. reading on the meter (90 mg./100 ml.).

The following example is given in illustration and is not intended as a limitation on the scope of this invention.

EXAMPLE

A fresh sample of human blood was divided into five 10 ml. aliquots. To each was added 222 mg. of Na$_2$HPO$_4$·12 H$_2$O and 22 mg. of NaH$_2$PO$_4$ as buffer and 10 mg. of benzoquinone. The members were prepared by inserting a platinum anode in each and securing a 1 mil cellophane dialysis membrane to the bottom of each. To the glucose oxidase member was added 2 mg. of a glucose oxidase solution and 0.2 ml. of the same buffer. The reference member was completed by adding thereto 0.2 ml. of the same buffer.

One aliquot of blood was tested without further addition. To each of the others, a measured amount of glucose was added as follows:

| Aliquot No. | Glucose mg./100 ml. |
|---|---|
| 2 | 90 |
| 3 | 180 |
| 4 | 270 |
| 5 | 360 |

Each aliquot was then measured by placing it in the reservoir, inserting the members and cathode therein, applying about 0.7 volt to the cathode, measuring the current differential produced at the members and converting the results to glucose concentration. The tests were run at 25° C. and the reservoir was carefully cleaned between each test. The results obtained are set forth in the following table.

| Aliquot No. | Glucose Concentration mg./100 ml. | |
|---|---|---|
| | Actual | Read |
| 1 | (34) | 34 |
| 2 | 124 | 126 |
| 3 | 214 | 226 |
| 4 | 304 | 290 |
| 5 | 394 | 414 |

It can be seen that the measured glucose content is within 6 percent of actual in every instance.

It is obvious that many variations may be made in the apparatus and process of this invention without departing from the spirit and scope thereof as defined by the appended claims.

What is claimed is:

1. A process for measuring glucose concentration in solutions thereof which comprises adding an excess of buffer solution and a quinone to the glucose solution, inserting therein a cathode, a member containing an anode, glucose oxidase and buffer solution and a reference member containing an anode and buffer solution, each of said members having affixed across the bottom thereof a dialysis membrane permeable to glucose and quinone but not to glucose oxidase, applying a potential between the cathode and the two anodes and measuring the currents produced.

2. A process as in claim 1 wherein the quinone is benzoquinone.

3. A process as in claim 1 wherein the dialysis membrane is cellulose.

4. A process as in claim 1 wherein the glucose solution is whole blood.

* * * * *